United States Patent
Sesita et al.

(10) Patent No.: US 7,511,396 B2
(45) Date of Patent: Mar. 31, 2009

(54) MOVING MATERIAL ELECTRIC CONTROL DEVICE

(75) Inventors: Naoto Sesita, Kawasaki (JP); Katuyuki Tanaka, Kawasaki (JP); Yusuke Mizukoshi, Kawasaki (JP); Hiroyuki Kurihara, Fujisawa (JP); Yoshihisa Watanabe, Yokohama (JP); Hiroshi Sato, Nirasaki (JP)

(73) Assignees: Igarashi Electric Works Ltd., Kawasake-shi (JP); Mitsui Mining and Smelting Co., Ltd., Tokyo (JP)

( * ) Notice: Subject to any disclaimer, the term of this patent is extended or adjusted under 35 U.S.C. 154(b) by 419 days.

(21) Appl. No.: 11/379,262

(22) Filed: Apr. 19, 2006

(65) Prior Publication Data
US 2006/0238060 A1 Oct. 26, 2006

(30) Foreign Application Priority Data
Apr. 26, 2005 (JP) ............................. 2005-128435

(51) Int. Cl.
*H02K 1/00* (2006.01)
(52) U.S. Cl. .................................................... 310/179
(58) Field of Classification Search ................ 310/180, 310/249, 197, 198, 204
See application file for complete search history.

(56) References Cited

U.S. PATENT DOCUMENTS

| 2003/0048022 A1* | 3/2003 | Nagai et al. ............... 310/215 |
| 2004/0145268 A1* | 7/2004 | Yamamoto et al. .......... 310/249 |
| 2005/0168100 A1* | 8/2005 | Abe et al. .................. 310/233 |
| 2006/0181108 A1* | 8/2006 | Cleland et al. ........... 296/146.4 |

FOREIGN PATENT DOCUMENTS

| JP | 10-141409 A | 5/1998 |
| JP | 11-72395 A | 3/1999 |
| JP | 2004-175211 A | 6/2004 |

* cited by examiner

*Primary Examiner*—Jean F Duverne

(57) ABSTRACT

A motor comprises a yoke as casing, a shaft extending along a center of the yoke, an annular stator fixed to the yoke and an armature fixed to the shaft to rotate with the shaft inside the stator. The armature comprises a plurality of teeth on the outer circumferential surface. A wire is wound on any of the teeth to form a normal coil. Another wire is wound on another of the teeth to form a brake coil that is a short circuit. When the motor rotates much faster, the brake coil produces magnetic flux which acts as load against the rotation of the motor to allow the motor to rotate slower.

4 Claims, 4 Drawing Sheets

MOVING MATERIAL ELECTRIC CONTROL DEVICE

BACKGROUND OF THE INVENTION

The present invention relates to a moving material electric control device that controls a moving material such as a door, a window or a seat with an electric actuator and especially to a moving material electric control device that automatically opens a rising-type back door of a motor vehicle and a sliding window of a side door or a roof of a motor vehicle.

JP11-72395A discloses a door opening device of a sliding door at the side of a motor vehicle. In JP10-141409A, in a hatch-back-type car or a station wagon, baggage is taken in or out through a rising-type back door. To assist opening/closing of the back door, a gas spring is mounted. The gas spring contains a high-pressure gas for bearing the weight of the back door and hydraulic oil for applying damping force to the partition end.

JP2004-175211A discloses a back door opening/closing device for assisting opening force with a gas spring and a motor.

However, in a back-door opening/closing device for assisting opening/closing force with a gas spring, in the closed back door, the door is disposed almost in parallel with the gas spring, so that the gas spring does not contribute enough to turn the door. Accordingly, when the door starts to open, the weight of the door makes it difficult to open, and the door rises fastly when pressing force of the gas spring surpasses the weight.

Meanwhile, when a gas spring is used with a motor, a door opens and closes relatively smooth in spite of almost parallel relationship of the door with the gas spring.

But, support assisting force of a gas spring and a motor is not generally proportional to the angles of a door. When the door opens greatly, upward-pressing force of the gas spring becomes greater than the door weight to enable motor-turning force to be created when the door is opened by the motor. The force increases on a slope and at high temperature. The motor requires high output power and gear efficiency is designed at relatively higher extent, so that the motor is rotated at high speed by the force. Thus, the door is likely to open and close quicker than expected.

In a door opening/closing device in which a sliding door on the side or a roof of a motor vehicle opens and closes horizontally, a slope makes opening torque of the door different. Specifically, when the door moves downwards of the slope, motor-turning force is applied to cause the motor to turn at high speed, so that the door is likely to open strongly.

SUMMARY OF THE INVENTION

In view of the disadvantages in the prior art, it is an object of the invention to provide a moving material electric control device in which a moving material is braked if operation speed of an actuator is higher than expected regardless of driving power of a motor thereby enabling the moving material to move within a certain speed any time automatically without control of driving control unit of the motor.

BRIEF DESCRIPTION FO THE DRAWINGS

The features and advantages of the invention will become more apparent from the following description with respect to embodiments as shown in appended drawings wherein.

DETAILED DESCRIPTION OF PREFERRED EMBODIMENTS

Figure 1:
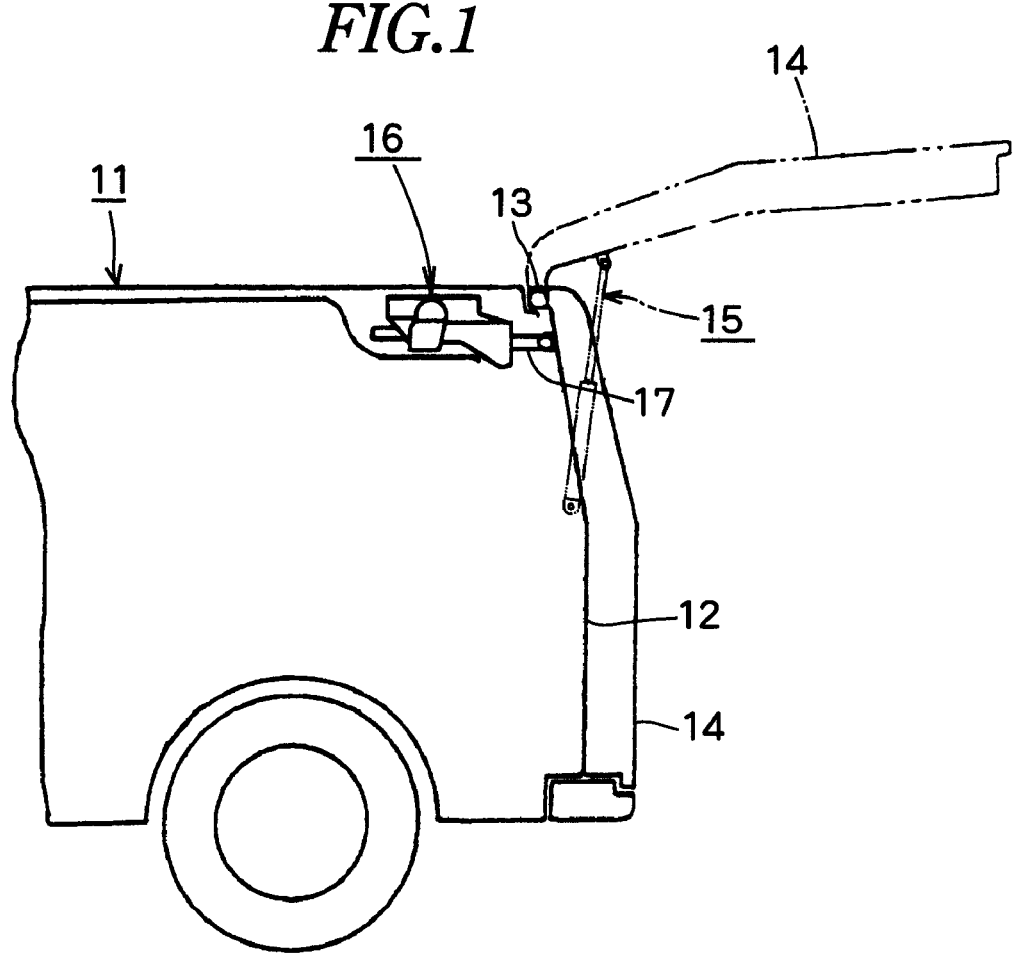
FIG. 1 is a side view of the rear part of a motor vehicle to which the present invention is applied.

In FIG. 1, on a rear panel 12 of a motor vehicle 11, a back door 14 is pivoted on a pivot 13 between a closed position in solid lines and an opening position in dotted lines. Between the rear panel 12 and the back door 14, a pair of gas-spring actuator 15, 15 is provided within the back door 14, and a motor-driving actuator 16 having a rotation-controllable motor is provided at the upper end of the back door 14.

The gas-spring actuator 15 comprises a known gas spring which urges the back door 14 to open when the back door 14 opens higher than a predetermined position. In contrast, when the back door 14 closes lower than the position, the gas spring provides a little resistance to allow the back door 14 to close smoothly.

Figure 2:
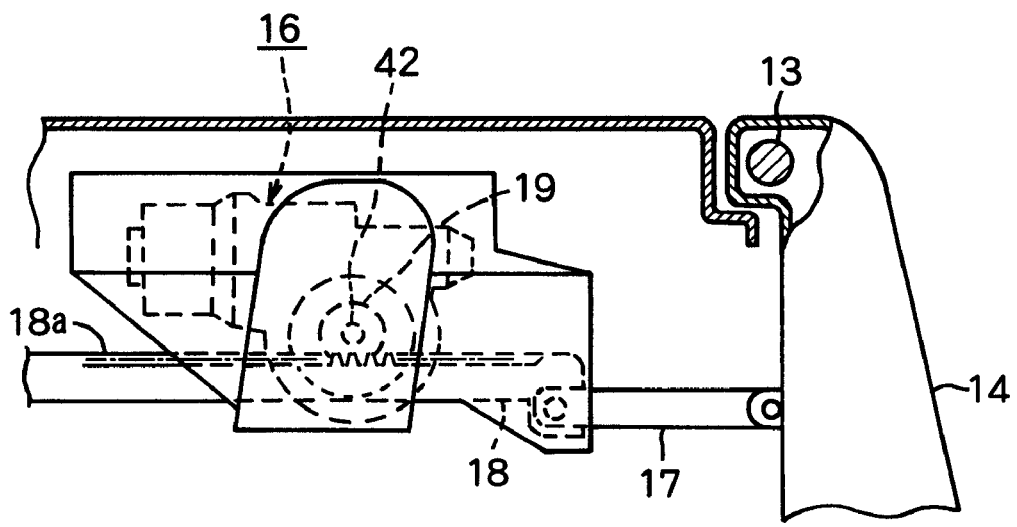
FIG. 2 is an enlarged view of the main part.

As shown in FIG. 2, the motor-driving actuator 16 comprises a pinion 19 which meshes with a rack 18a of an output member 18 which moves back and forth in the motor vehicle 11. The rack 18a is connected to a link lever 17 which moves back and forth together with the back door 14.

Figure 3:
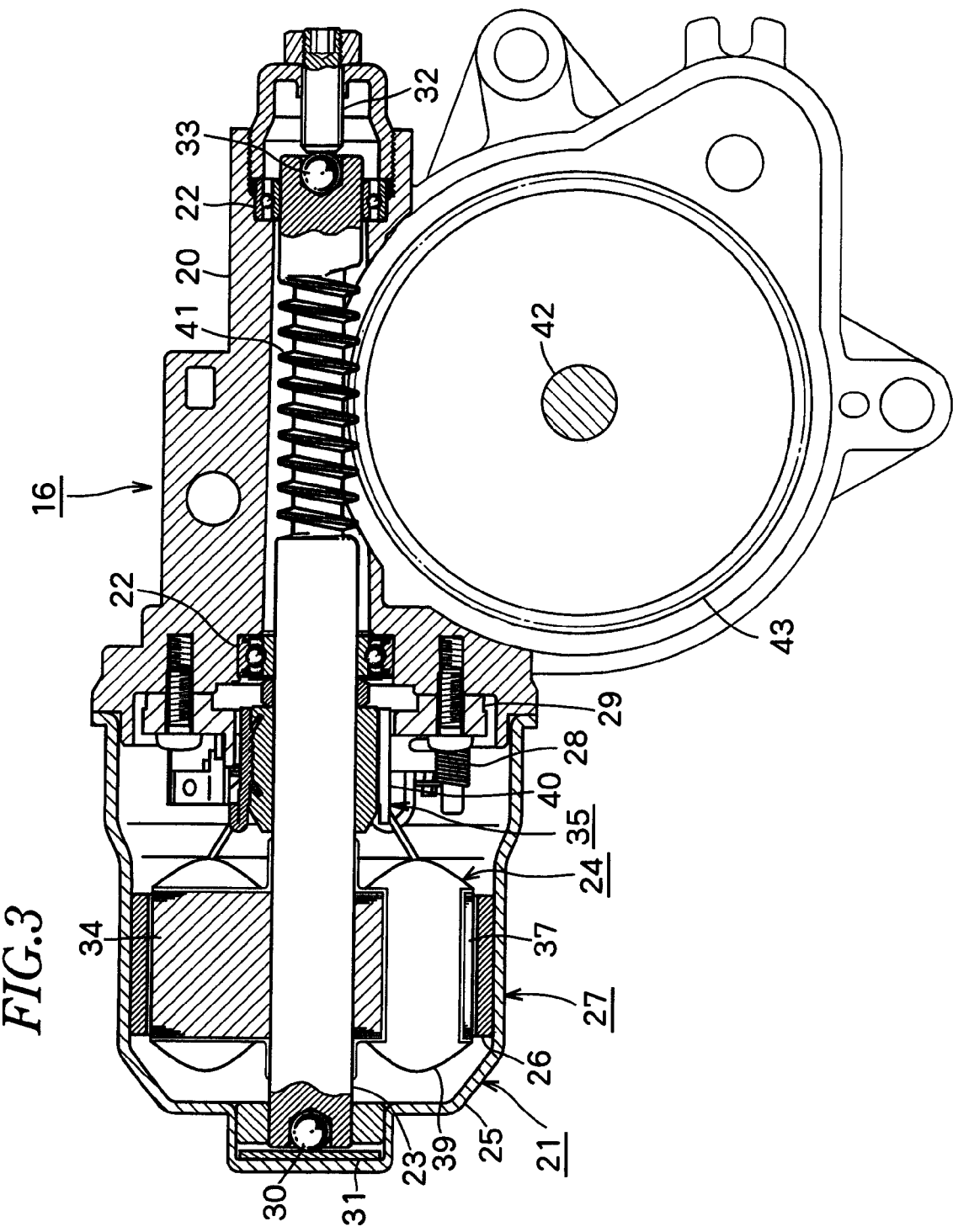
FIG. 3 is a cross-sectional view of the internal structure of a motor-driving actuator in the motor vehicle.

FIG. 3 is a sectional view showing the inside of the motor-driving actuator 16. In FIG. 3, the motor-driving actuator 16 comprises a rotation-controllable motor 21 at one end of the casing 20.

The motor 21 comprises a shaft 23, an armature 24 and a stator 27. The shaft 23 extends along a center of the casing 20 and is rotatably supported by two bearings 22,22 in the casing 20. The armature 24 is fixed on the shaft 23. The stator 27 comprises a yoke 25 also used as a bottom-having cylindrical motor case and fixed to one end of an actuator case body 20 covering the armature 24, and a permanent magnet 26 as field magnet surrounding the armature 24 in the yoke 25.

A brush 28 which supplies an electric current to the armature 24 is mounted to the actuator case body 20 via a base plate 29 having an electric terminal (not shown). At one end of the yoke 25, there is provided a bearing 31 which receives axial force via a steel ball 30 at the end of the shaft 23. At the other end of the actuator case body 20, a bearing 32 receives axial force via a steel ball 33 at the other end of the shaft 23.

The permanent magnet 26 is annular, is pressingly fitted in the yoke 25 and if necessary is bonded. On the inner circumferential surface of the permanent magnet 26, a plurality of N-poles and S-poles are alternately magnetized at regular intervals.

An armature iron core 34 fixed to the shaft 23 is disposed inside the permanent magnet 26. A commutator 35 is disposed near the armature iron core 34 in FIG. 3 and the brush 28 is located around the commutator 35.

Figure 4:
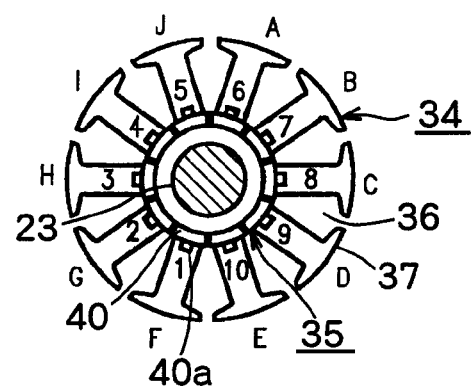
FIG. 4 is an enlarged view of an armature iron core and a commutator in a motor.
Figure 5:
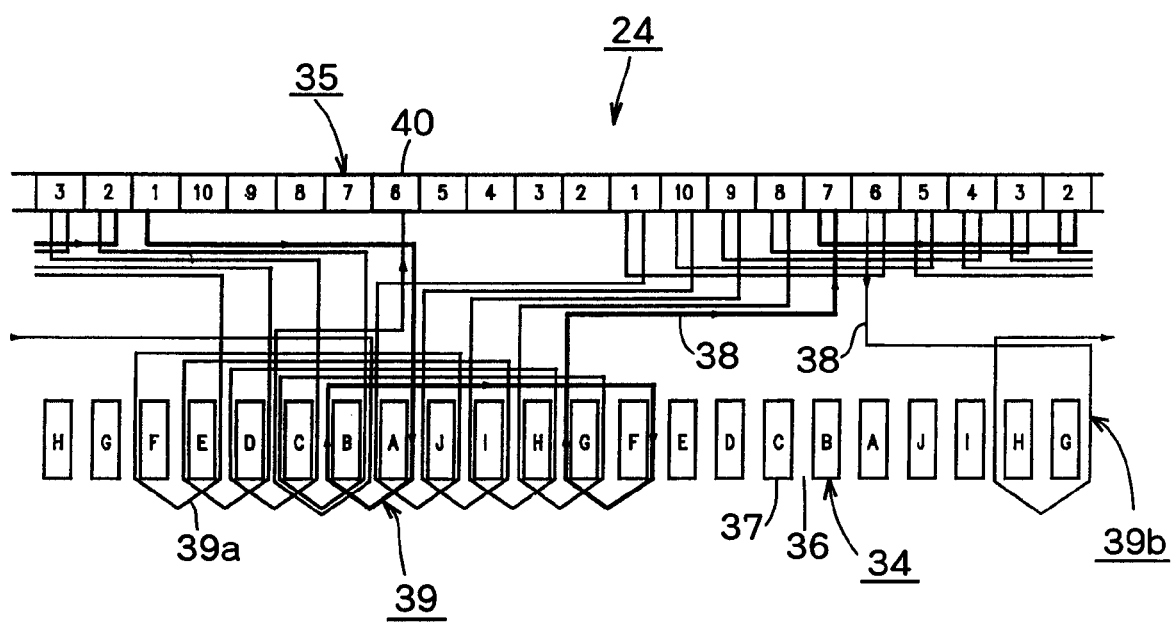
FIG. 5 is a developed view of the connection of the motor.

FIG. 4 shows the structure of the armature iron core 34 and the commutator 35. In FIG. 4, the armature iron core 34 comprises, for example, laminated Si steel plates and ten slots 36 extending in an axial direction of the shaft 23 and equally spaced circumferentially. In FIGS. 4 and 5, there are ten T-shaped teeth 37 divided equally by the slots 36 and shown with A-J. A wire 38 is wound around the teeth 37 to form a coil 39.

The commutator 35 comprises ten commutator segments 40 fixed to the shaft 23 and distinguished with the numerals 1-10 in FIGS. 4 and 5. The commutator segments 1-10 are insulated from each other circumferentially and the outer circumferential surfaces thereof are in sliding contact with the brush 28. Each of the commutator segments 40 has an engagement claw 40a which is connected to each end of the wires 38 as shown in FIG. 4.

FIG. 5 is a developed view which shows the connection of the rotation-controllable motor 21 in the motor-driving actuator 15 in FIG. 3. The coil 39 comprises normal coils 39a and a brake coil 39b.

As shown in FIG. 5, the normal coil 39a is wound as below. The wire 38 from a commutator segment 1 is wound on teeth A,B at predetermined times, wound on teeth F,G at predetermined times and returned to a commutator segment 7. The wire 38 from a commutator segment 2 is wound on teeth B,C at predetermined times, wound on teeth G,H and returned to a commutator segment 8. The wire 38 from a commutator segment 3 is wound on the teeth C,D at predetermined times, wound on the teeth H,I at predetermined times and returned to a commutator segment 9. Furthermore, the wire is wound on adjacent teeth one by one to form the certain normal coil 39a.

Meanwhile, the wire 38 from a commutator segment 6 is wound on the teeth G,H at predetermined times, wound on the teeth B,C equally spaced circumferentially or by 180 degrees at predetermined times and returned to the commutator segment 6 to form a short circuit. Thus, the brake coil 39b generates electromotive force having strength proportional to rotation number of the armature 24. Specifically, with increase of the rotation number of the armature 24, greater electromotive force is generated between the terminals of the brake coil 39b. Short current of the electromotive force creates magnetic flux to the brake coil 39b and the magnetic flux acts as load against the rotation of the armature 24 to suppress high-speed rotation of the motor 21.

The wire is 0.6 mm in diameter, the number of windings of the normal coil 39a is seventeen and the number of windings of the brake coil 39b is five, but the diameter of the wire 38 and the number of windings and winding form of the each of the coils 39a,39b are variable depending on demand and performance. For example, the amount of load by the brake coil 39b is variable depending on the change in the number of the teeth 37 and the winding number of the wire. Generally the increased number increases load. However, the brake coil 39b is provided on the teeth 37 at equally-divided turning positions such as 180, 120 and 90 degrees to maintain the balance of load with respect to the armature 24 thereby suppressing vibration or noise by uneven rotation.

A worm gear 41 is provided between the bearings 22 and 22 in the shaft 23. A worm wheel 43 mounted to a driving shaft 42 rotating together with the pinion 19 in FIG. 2 meshes with the worm gear 41.

It operation will be described. In this embodiment, feed of electricity to the motor 21 is carried out by a switch moving with a lock release lever (not shown) of the back door 14. Accordingly, when the lock release lever is operated, the motor 21 rotates normally and the rotation is transmitted to the output member 18 via the shaft 23, the worm gear 41, the driving shaft 42, the pinion 19 and the rack 18a to allow the output member 18 to move in an opening direction. Thus, the link lever 17 rotates in an opening direction with the pivot 13 and the back door 14 to allow the back door 14 to start to rotate. When the back door 14 opens, force of the gas-spring actuator 15 is applied to allow the back door 14 to open by a greater force. When the back door 14 is in full-opening, feed is stopped by a switch (not shown) to allow the motor 21 to stop in rotation.

The feed to the normal coil 39a is controlled by computer programming for feedback of the number of rotation of the motor 21, which is well-known.

When the motor vehicle 11 stops on a slope to allow opening torque of the back door 14 to become much less than expected, load torque applied to the gas-spring actuator 15 becomes much smaller to raise rapid opening to allow the motor 21 to rotate by external force, so that the motor 21 rotates faster than expected. With faster rotation of the motor 21, greater electromotive force is generated between the terminals of the brake coil 39b to create great magnetic flux on the brake coil 39b. The magnetic flux is applied as load against the rotation of the armature 4 to suppress rotation of the motor 21 thereby preventing the back door 14 from rising rapidly.

Figure 6:
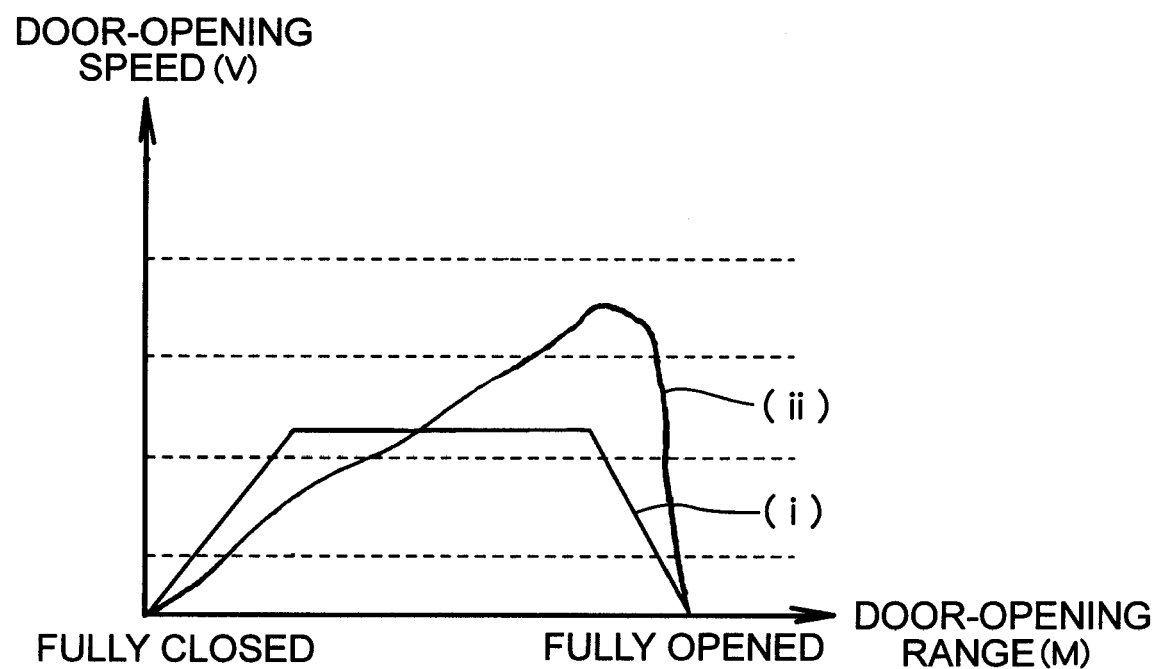
FIG. 6 is a graph for comparison of door speed when the motor-driving actuator and a known gas-spring actuator are both used and when the known gas-spring actuator is only used.

FIG. 6 shows comparison in door-opening speed of the motor-driving actuator 16 with the motor 21 of the present invention and the known gas-spring actuator 15 with the known gas-spring actuator 15. Numeral (i) denotes speed when the motor-driving actuator 16 in this embodiment is used with the gas-spring actuator 15, while (ii) denotes speed when only the gas-spring actuator 15 is used. The vertical axis represents door-opening speed (v) and the horizontal axis represents door-opening range.

In this embodiment (i), at the same time with opening of the back door 14, the motor 21 is driven to provide smooth opening and speed is controlled by the normal coil 39a of the motor 21 to suppress the door within control range thereby preventing the back door from jumping up and from hitting another material severely. Meanwhile, in use of only the known gas-spring actuator 15, smaller load to the back door 14 increases speed rapidly near the full opening, so that the back door 14 is likely to jump up strongly by driving force of the gas spring even though driving electricity to the normal coil 39a is completely shut off.

The foregoing relates to the back door 14 to which the present invention is applied, but the motor-driving actuator of the present invention is applicable to a door opening device that opens and closes a sliding door at the side of a motor vehicle horizontally and an opening device of a sunroof by a motor to achieve similar advantages. The motor-driving actuator 16 and known gas-spring actuator 15 are both used, but the motor-driving actuator 16 is only used.

Thus, according to the present invention, if rotation speed of the motor 21 is higher than the expected range programmed in the normal coil 39a, the program control means stops power feed to the normal coil 39a. But if the motor 21 still rotates at high speed, the rotation of the motor 21 is automatically braked to make it impossible to rotate within a certain speed range any time. Without special speed control circuit or control means for controlling the normal coil 39a, operation speed of the actuator 16 can be controlled with simple structure to provide an inexpensive actuator and an automatic control device.

Operation speed of the actuator 16 can be carried out with the change in the number of winding of the brake coil 39b of the motor 21 and the number of the wound teeth 37 thereby realizing flexible solution regardless of the change in required performance.

The foregoing merely relates to an embodiment of the invention. Various changes and modifications may be made by a person skilled in the art without departing from the scope of claims wherein:

What is claimed is:

1. A moving material electric control device for controlling a moving material, said device comprising a motor;

said motor comprising:

a yoke as casing;

a shaft extending along a center of the yoke;

a stator fixed to the yoke;

an armature fixed to the shaft to rotate with the shaft inside the stator, said armature comprising an iron core that comprises a plurality of teeth divided by a plurality of slots extending axially of the shaft and formed circumferentially; and a commutator fixed on the shaft close to the armature, comprising a plurality of commutator segments on an outer circumferential surface, a first wire that extends from a first of the commutator segments being wound on one of said plurality of teeth and returning to a second of the commutator segments to form a normal coil, while a second wire that extends from a a third of the commutator segments is wound on another of said plurality of teeth of the armature and returning to the third of the commutator segment to form a brake coil acting as a short circuit.

2. A moving material electric control device as claimed in claim 1 wherein the the normal coil and the brake coil are wound on two adjacent teeth of the iron core respectively.

3. A moving material electric control device as claimed in claim 1 wherein the moving material comprises a back door of a motor vehicle, said back door being opened with a gas spring.

4. A moving material electric control device as claimed in claim 2 wherein the normal coil and the brake coil are further wound respectively on two adjacent teeth of the iron core opposite to the two adjacent teeth already wound thereon.

* * * * *